United States Patent

[11] 3,587,348

[72] Inventors Constantin Enoiu;
 Valeriu Sergiu Popa, Bucharest, Romania
[21] Appl. No. 800,129
[22] Filed Feb. 18, 1969
[45] Patented June 28, 1971
[73] Assignee Grupul Industrial Foray Extractie Titeiu
 Mainesti, Moinesti, Romania
[32] Priority Feb. 19, 1968
[33] Romania
[31] 55922

[54] REDUCER GEAR
 10 Claims, 2 Drawing Figs.
[52] U.S. Cl. .................................................. 74/797,
 74/63, 175/106
[51] Int. Cl. .................................................. F16h 1/28,
 F16h 13/08, F21b 3/08
[50] Field of Search ......................................... 74/797,
 640, 750, 63; 175/106

[56] References Cited
 UNITED STATES PATENTS
 1,449,352 3/1923 Seeck ............................. 74/63

| | | | |
|---|---|---|---|
| 2,704,459 | 3/1955 | Nanni............................ | 74/63 |
| 3,022,839 | 2/1962 | Trocke........................... | 175/201 |
| 3,383,931 | 5/1968 | Patterson, Jr.................. | 74/63 |
| 3,407,887 | 10/1968 | Vivion............................ | 175/106 |
| 3,468,175 | 9/1969 | Rabek............................ | 74/63 |

Primary Examiner—Arthur T. McKeon
Attorney—Karl F. Ross

ABSTRACT: An input shaft 1 is connected to the sun gear 4 of a planetary-gear set whose planet carrier 7, 11 is fixed to an output shaft 12 while an associated ring gear is formed by a stationary housing 22, the planetary pinions being constituted by rotatable discs 7 bearing independently rotatable rollers 5 which act as teeth by fitting into peripheral recesses c of the housing; the teeth of the sun gear are constituted by pointed cams 4 whose angular spacing or pitch is considerably greater than that of the recesses whereby an increased stepdown ratio is realized even with a relatively small ratio of the pitch radii of the ring and sun gears.

REDUCER GEAR

Our present invention relates to a reduction-gear assembly designed to transmit the torque of a high-speed prime mover, such as a turbine, to a low-speed load, e.g. a boring tool for well drilling.

Some conventional speed-reducing systems use planetary-gear transmissions wherein an input shaft drives a sun gear which, through one or more pinions mounted on a planet carrier, exerts a torque upon a ring gear coaxial therewith; with the ring gear held stationary, the planet carrier is connected to an output shaft, or vice versa. If the radii of the sun gear and the ring gear are respectively designated $r$ and $R$, and if $\omega_i$ and $\omega_o$ respectively designate the rotary speeds of the input and output shafts, the ratio $\omega_i:\omega_o$ is given either by $-R/r$ (with the planet carrier immobilized) or by $R/r+1$ (with nonrotating ring gear). In either case, therefore, the speed ratio depends on the ratio $R/r$ of the radii and is correspondingly limited by practical considerations such as the diameter of the transmission housing.

The general object of our present invention is to provide an improved speed-reducing system adapted for the transmission of large torques with substantial stepdown ratios even in the presence of severe dimensional limitations.

A more particular object is to provide a transmission system of this type specifically adapted for insertion between a substantially vertical drive shaft and a rotating tool holder such as an auger stem.

The present invention springs from the realization that the aforestated speed ratios are based upon the assumption of continuous engagement of the teeth of the sun and ring gears with those of the planetary pinion or pinions. Therefore, if the continuous set of teeth of the sun gear is replaced by a single point, or by a small number of such points whose angular spacing or pitch is considerably greater than that of the ring gear so that the planetary gear train is driven only intermittently, the average speed of the output shaft will be considerably reduced for a given input-shaft speed without any change in the radii of the gears.

Thus, in accordance with the present invention, we provide a set of transmission elements which effectively play the parts of sun gear, planet carrier and ring gear, and which therefore will be so designated in the ensuing description, but wherein the sun gear has only one tooth or a small number of teeth constituted by a point or points arranged for intermittent camming engagement with a set of projections on one or more hubs rotatable on a carrier member about axes parallel to that of the sun and ring gears, these projections being also receivable in the recesses separating the teeth of the surrounding ring gear. Advantageously, for smoother rotation of the output shaft, the number of planetary pinions on the carrier member equals the number $n$ of points on the sun gear times the number $m$ of camming projections per pinion whereby the planetary gear train is stepped $nm$ times during each revolution of the sun gear gear.

In order to minimize the frictional resistance of such a system, we prefer to journal the camming projections in their hubs for independent rotation with the aid of suitable antifriction bearings. Thus, the projections may simply be in the form of bearing-supported pins, yet a more efficient construction comprises a set of fixed pins having rollers rotatably journaled thereon.

Particularly where our improved transmission system is to be used for well-drilling purposes, the ring gear may be constituted by a sleeve forming part of a stationary housing, this housing also including an outer shell which together with the sleeve forms a channel for the passage of a scavenging fluid. The pressure of this scavenging fluid may be used, according to another feature of our invention, to ensure proper lubrication of the bearings of the planetary gear train within the housing by acting upon a flexible membrane which seals the lubricant-filled interior of the housing against that channel.

The invention will be described in greater detail with reference to the accompanying drawing in which.

Figure 1:
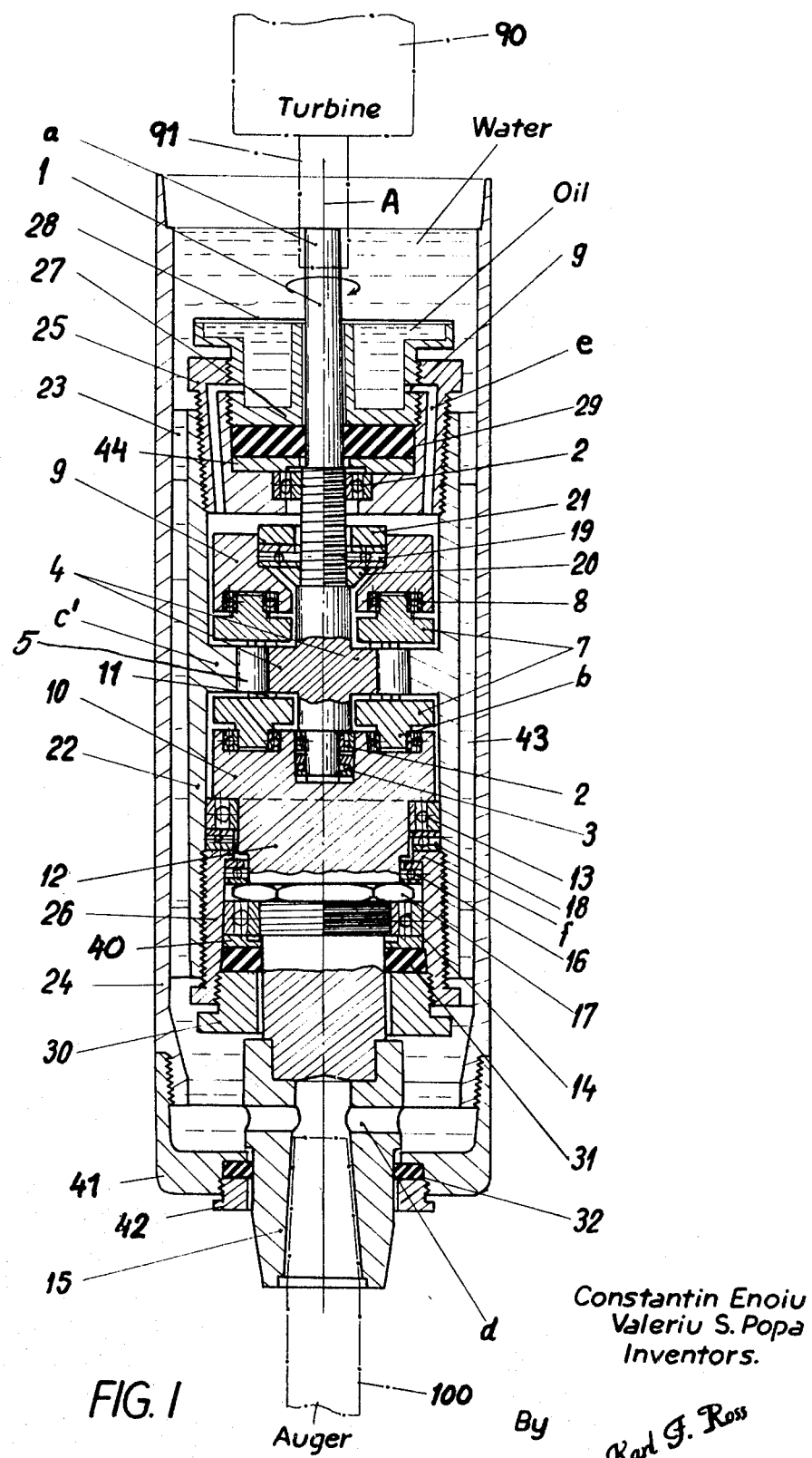
FIG. 1 is an axial sectional view of a speed reducer according to the invention, forming part of a well-drilling rig.

The system shown in the drawing comprises a well-drilling rig including a driving turbine 90 and an auger 100, the latter having a stem of conventional tubular shape designed for the circulation of a scavenging fluid. Turbine 90 has a drive shaft 91 mechanically coupled, by means not further illustrated, with the upper end $a$ of an input shaft 1 having a vertical axis A, this shaft being supported by journal bearings 2 and thrust bearings 3 on an enlarged head 10 of an output shaft 12 coaxial with shaft 1. The lower end of shaft 1 is surrounded by a ring 9 which is rigidly connected with head 10 by a set of profiled vertical stays 11 and forms therewith a rotatable cage integral with output shaft 12. The assembly 9—12 is journaled in a sleeve 22 via a bearing 13 and rests via a thrust bearing 18 on a flange $f$ of a collar 26 screwed into the lower end of the sleeve. A nut 17, threaded onto a reduced portion of shaft 12, engages a further thrust bearing 16 which abuts the flange $f$ from below. Another journal bearing 14 braces the nut 17 against the inner wall of collar 26. A packing gland 30, screwed into the lower end of collar 26, bears upon a sealing gasket 31 overlain by a disc 40 which supports the outer race of bearing 14.

Sleeve 22 is connected, via peripheral spacers 23, with an outer shell 24 forming part of a transmission housing. This shell is closed on its lower end by a screwcap 41 receiving a nut 42 which clamps a gasket 32 in position around an adapter 15 screwed onto the lower end of shaft 12, this adapter supporting the auger 100. Housing portions 22 and 24 together define an annular channel 43 for water or some other scavenging fluid delivered under elevated pressure to the top of shell 24 for circulation to the bottom of the well by way of transfer bores $d$ in adapter 15 and the hollow stem of auger 100.

A plug 25 is threaded into the upper end of sleeve 22 and is formed with several passages $e$ which communicate via orifices $g$ with a pool of oil within another packing gland 27 screwed into the plug 25. Gland 27 bears upon a gasket 29, overlying a retaining disc 44 for bearing 2, and has its oil space sealed at the top by a flexible membrane 28 serving to equalize the pressure between the surrounding body of liquid and the pool of oil confined between this membrane and the lower packing gland 30. The stays 11 may consist of hard rubber, plastic material (e.g. Teflon) or metal.

Figure 2:
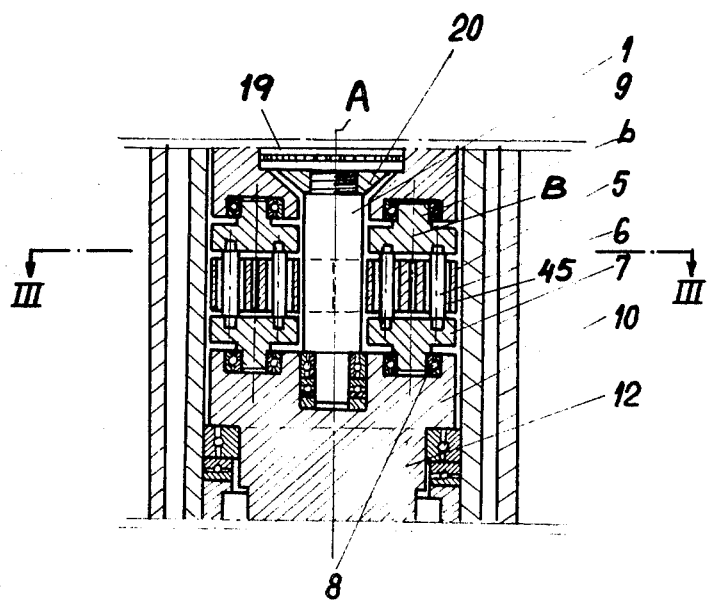
FIG. 2 is an axial sectional view similar to that of FIG. 1 but showing the assembly in a different position.
Figure 3:
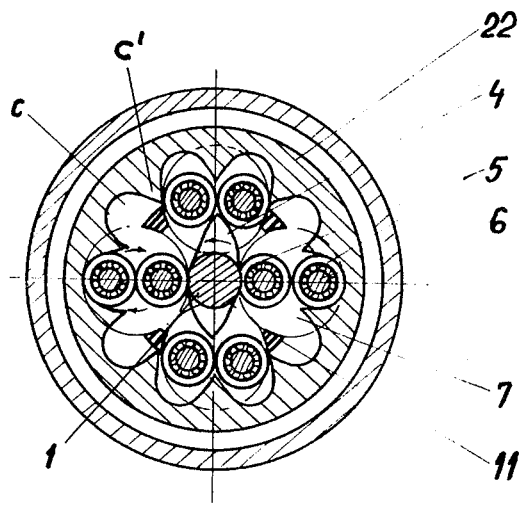
FIG. 3 is a cross-sectional view taken on the line III—III of FIG. 2.

As best seen in FIG. 3, annular member 22 has a central zone formed with inner peripheral teeth $c'$ which are separated by lobate recesses $c$; in the specific embodiment illustrated, the number of these teeth and recesses is 10 and their angular spacing or pitch is therefore 36°. Cage 9—11, acting as a planet carrier, supports a set of four equispaced pinions each constituted by a hub 7 and a pair of rollers 5 which are journaled, via needle bearings 45, on pins 6 disposed on opposite sides of the respective hub axis B (FIG. 2). Hub 7 consists of a pair of confronting discs each having an integral stud shaft $b$ journaled by means of a ball bearing 8 in cage member 9 or 12. Member 9 has a central recess occupied by a nut 21 which, through a thrust bearing 19, bears upon a nut 20 screwed onto a reduced section of shaft 1.

The lower extremity of shaft 1, slightly enlarged in diameter, is designed as a sun gear provided with a pair of diametrically opposite teeth in the form of points 4 bounded by arcuate camming edges. These points are designed to cooperate with the rollers 5 on hubs 7 which are swung about their axes B upon the passage of each point. The rollers are receivable in the recesses $c$ of the ring gear constituted by the central portion of sleeve 22, the orbits of the rollers just clearing the stays 11 of the cage.

In operation, rotation of shaft 1 at a constant speed (e.g. counterclockwise as indicated by the arrow in FIG. 3) causes the points 4 thereof to step the rollers 5 of successive pinions 5—7 through arcs somewhat less than a quarter turn whereby, after a full revolution of shaft 1, the output shaft 12 has been rotated through one-sixth of a revolution, this stepdown ratio of 1:6 being established by the relationship $$\frac{\omega_i}{\omega_o} = \frac{N}{n} + 1$$

which is derived from the conventional planetary-gear formula given above by the substitution of the number of teeth N of the ring gear and the number of teeth $n$ of the sun gear for the corresponding radii R and $r$. In the present instance N=10 and $n$=2. It will also be noted that the number of pinions 5—7, here four, corresponds to the product $mn$ where $m$ is the number of rollers 5 per pinion.

FIG. 3 clearly shows that the shape of the camming points 4 and of the recesses $c$ ensures a virtually continuous rotation of each hub 7 despite the fact that the points 4 make only intermittent contact with the rollers of each individual pinion.

Thus, it will be seen we have provided a transmission system affording a large stepdown ratio in a highly compact assembly and that the efficiency of torque transmission is increased by the use of antifriction bearings at all points of contact. The presence of a deformable membrane 28 maintains adequate lubricating pressure despite expansion or contraction of oil volume with varying temperatures and automatically compensates for minor leakage losses.

We claim:

1. A speed-reducing system comprising an input shaft, planetary-gear means including a ring gear, a sun gear and a rotatable carrier member bearing at least one pinion engageable with said sun and ring gears, said input shaft gear being connected to said sun gear, and an output shaft coaxial with said input shaft; said ring gear being an annular member coaxially surrounding said shafts and having an array of inner peripheral teeth separated by recesses; said pinion comprising a hub rotatable on said carrier member about an axis offset from that of said shafts and a plurality of peripherally equispaced projections on said hub receivable in said recesses; said sun gear being formed with peripheral cam means disposed for intermittent engagement with said projections upon rotation by said input shaft to roll said pinion along the inner periphery of said annular member; said output shaft being coupled with one of said members for entrainment thereby at a speed substantially less than that of said input shaft.

2. A system as defined in claim 1 wherein said projections are generally cylindrical bodies journaled on said hub for independent rotation.

3. A system as defined in claim 2 wherein said bodies are rollers, said pinion including a set of pins on said hub and antifriction bearing means supporting said rollers on said pins.

4. A system as defined in claim 3 wherein said carrier member comprises a cage with a pair of axially spaced rings, said hub including a pair of axially spaced discs respectively journaled on said rings, said pins spanning said discs and carrying said rollers between confronting disc surfaces.

5. A system as defined in claim 2 wherein said cam means comprises a set of peripherally spaced points with an angular spacing substantially greater than that of said recesses, said carrier member bearing a number of pinions equal to the number of said points times the number of said projections per pinion.

6. A system as defined in claim 1 wherein said annular member is stationary, said output shaft being rigid with said carrier member.

7. A system as defined in claim 6 wherein said annular member is a sleeve forming part of a housing further including an outer shell spacedly surrounding said sleeve and forming a channel therebetween for a high-pressure fluid, said output shaft terminating in a tool-holding head provided with at least one passage communicating with said channel.

8. A system as defined in claim 7 wherein said shafts and said carrier member are provided with bearing means rotatably supporting same within said housing, further comprising sealing means closing the ends of said sleeve against said channel and forming within said sleeve a space filled with lubricant for said bearing means.

9. A system as defined in claim 8, further comprising a membrane forming part of said sealing means for equalizing the pressures of said lubricant and of the fluid in said channel.

10. A system as defined in claim 9 wherein said shafts are substantially vertical, said input shaft having an upper end connectable to a source of driving torque above said housing, said head projecting from the bottom of said housing for engagement with a boring tool.